United States Patent [19]

Okamura et al.

[11] Patent Number: 6,003,320
[45] Date of Patent: Dec. 21, 1999

[54] COLD ACCUMULATING MATERIAL FOR EXTREMELY LOW TEMPERATURE COLD, REFRIGERATOR USING THE SAME AND HEAT SHIELDING MEMBER

[75] Inventors: Masami Okamura; Tomohisa Arai; Keisuke Hashimoto, all of Yokohama; Rohana Chandrtilleke, Kiyose; Hideki Nakagome, Tokyo, all of Japan

[73] Assignee: Kabushiki Kaisha Toshiba, Kawasaki, Japan

[21] Appl. No.: 09/091,838

[22] PCT Filed: Oct. 30, 1997

[86] PCT No.: PCT/JP97/03956

§ 371 Date: Aug. 21, 1998

§ 102(e) Date: Aug. 21, 1998

[87] PCT Pub. No.: WO98/18880

PCT Pub. Date: Jul. 5, 1998

[30] Foreign Application Priority Data

Oct. 30, 1996 [JP] Japan .............................. PH8-288529

[51] Int. Cl.⁶ ................................ C09K 5/00; F25B 9/00; F28D 20/00
[52] U.S. Cl. ............................................ 62/6; 165/4; 60/520
[58] Field of Search .............................. 62/6, 467; 165/4; 60/520

[56] References Cited

U.S. PATENT DOCUMENTS

| | | | |
|---|---|---|---|
| 5,152,147 | 10/1992 | Saho et al. | 62/6 |
| 5,186,765 | 2/1993 | Arai et al. | 148/301 |
| 5,224,657 | 7/1993 | Kuriyama et al. | 241/24 |
| 5,298,337 | 3/1994 | Hendricks et al. | |
| 5,332,029 | 7/1994 | Tokai et al. | 165/4 |

FOREIGN PATENT DOCUMENTS

| | | |
|---|---|---|
| 4-59884 | 2/1992 | Japan . |
| 5-203272 | 8/1993 | Japan . |
| 6-101915 | 4/1994 | Japan . |

*Primary Examiner*—William Doerrler
*Attorney, Agent, or Firm*—Oblon, Spivak, McClelland, Maier & Neustadt, P.C.

[57] ABSTRACT

A cold accumulating material for extremely low temperature cold 1 is formed by filling pores 3 of a porous carrier 2 with magnetic particles 4 containing a rare earth element. The porous carrier 2 is desired to be formed of a sheet-shaped porous metal. A refrigerator according to this invention contains a cold reserving unit 5 filled with the aforementioned cold accumulating material for extremely low temperature cold 1. The above described structure is capable of exerting a sufficient refrigerating capacity with a small pressure loss of refrigerant (operating medium) and providing a cold accumulating material for extremely low temperature cold easy to process to a shape reducing the pressure loss and a refrigerator using the same.

15 Claims, 8 Drawing Sheets

HIGH TEMPERATURE SIDE

LOW TEMPERATURE SIDE

COLD ACCUMULATING MATERIAL FOR EXTREMELY LOW TEMPERATURE COLD, REFRIGERATOR USING THE SAME AND HEAT SHIELDING MEMBER

FIELD OF THE INVENTION

The present invention relates to a cold accumulating material for extremely low temperature cold for use in refrigerators or the like, a refrigerator using the same and an extremely low temperature heat shielding member, and more particularly to a cold accumulating material for extremely low temperature cold in which a pressure loss of refrigerant is so small that a refrigerating performance thereof can be exerted sufficiently and which is easy to process to a configuration reducing the pressure loss, a refrigerator using the same and an extremely low temperature heat shielding member.

BACKGROUND ART

Recently, superconductivity technology has been progressed remarkably and with an expanding application field thereof, development of a small, high performance refrigerator has become indispensable. For such a refrigerator, light weight, small size and high heat efficiency are demanded.

For example in a superconductive MRI apparatus, cryopump and the like, a refrigerator based on such refrigerating cycle as Gifford MacMahon type (GM refrigerator), Starling method has been used. Further, a magnetic floating train absolutely needs a high performance refrigerator. Further, in recent years, a superconductive power storage apparatus (SMES) or a in-magnetic field single crystal pull-up apparatus has been provided with a high performance refrigerator as a main component thereof. Further, to stabilize the temperature of a component material operating under ultra-low temperatures such as a superconductive wire, superconductive device, infrared ray sensor, the cold accumulating material for extremely low temperature cold for a thermal anchor, heat sink and heat shielding has been widely used.

FIG. 9 is a sectional view showing a main structure of a conventional two-staged GM refrigerator. This GM refrigerator 10 has a vacuum container 13 containing a first cylinder 11 having a large diameter and a second cylinder 12 connected coaxially to the first cylinder 11. The first cylinder 11 contains a first cold accumulating unit 14 which is freely reciprocatable and the second cylinder 12 also contains a second cold accumulating unit 15 which is freely reciprocatable. Seal rings 16, 17 are disposed between the first cylinder 11 and first cold accumulating unit 14, and between the second cylinder 12 and second cold accumulating unit 15 respectively.

The first cold accumulating unit 14 accommodates a first cold accumulating material 18 made of Cu mesh or the like. The second cold accumulating unit 15 contains a second cold accumulating material 19 made of a cold accumulating material for extremely low temperature cold. The first cold accumulating unit 14 and second cold accumulating unit 15 have operating medium (refrigerant) paths for He gas or the like which are provided in gaps of the first cold accumulating material 18 and cold accumulating material for extremely low temperature cold 19.

A first expansion chamber 20 is provided between the first cold accumulating unit 14 and second cold accumulating unit 15. A second expansion chamber 21 is provided between the second cold accumulating unit 15 and an end wall of the second cylinder 12. A first cooling stage 22 is provided on a bottom of the first expansion chamber 20 and further a second cooling stage 23 which is colder than the first cooling stage 22 is provided on a bottom of the second expansion chamber 21.

A high pressure operating medium (e.g., He gas) is supplied from a compressor 24 to the aforementioned two-staged GM refrigerator 10. The supplied operating medium passes through the first cold accumulating material 18 accommodated in the first cold accumulating unit 14 and reaches the first expansion chamber 20, and further passes through the second cold accumulating material (second cold accumulating material) 19 accommodated in the second cold accumulating unit 15 and reaches the second expansion chamber 21. At this time, the operating medium supplies heat energy to the respective first cold accumulating materials 18, 19 so that they are cooled. The operating medium passing through the respective first cold accumulating materials 18, 19 is expanded in the respective first expansion chambers 20, 21 so as to produce cool atmosphere thereby cooling the respective cooling stages 22, 23. The expanded operating medium flows in the respective cold accumulating materials 18, 19 in opposite direction. The operating medium receives heat energy from the respective cold accumulating materials 18, 19 and is discharged. As recuperation effect is improved in this process, the heat efficiency of the operating medium cycle is improved so that a further lower temperature is realized.

That is, in the above described GM refrigerator, the operating medium such as compressed He gas flows in a single direction in a cold accumulating unit filled with cold accumulating materials so that the heat energy thereof is supplied to the cold accumulating material. Then, the operating medium expanded here flows in an opposite direction and receives heat energy from the cold accumulating material. As the recuperation effect is improved in this process, the heat efficiency of the operating medium cycle is improved so that a further lower temperature is realized.

As a cold accumulating material for use in the above-described refrigerator, conventionally Cu. Pb and the like have been used. However, these cold accumulating materials have a very small volumetric specific heat in extremely low temperatures below 20 K. Therefore, the aforementioned recuperation effect is not exerted sufficiently so that it is difficult to realize the extremely low temperatures.

For the reason, recently to realize temperatures nearer absolute zero, use of magnetic cold accumulating material made of intermetallic compound formed from a rare earth element and transition metal element such as $Er_3Ni$, ErNi, $ErNi_2$, ErRh, $HoCu_2$ indicating a large volumetric specific heat in an extremely low temperature range has been considered.

The aforementioned magnetic cold accumulating material is usually processed to a sphere of 0.1–0.5 mm in diameter to carry out effective heat exchange with the operating medium such as He gas and actually used in the form of a magnetic particle. By applying the cold accumulating unit filled with the spherical magnetic particles to the GM refrigerator, a refrigerating operation to produce an arrival lowest temperature of 4 K is realized.

FIG. 10 is a sectional view showing an example of a structure of a low temperature cold reserving unit 30 using the aforementioned GM refrigerator 10, specifically a cold reserving unit for a superconductive magnet constituting a major part of a superconductive MRI unit, magnetic floating train, superconductive power storage unit (SMES), in-magnetic field single crystal pull-up apparatus and the like.

The low temperature cold reserving unit 30 in FIG.10, comprises a superconductive magnet 31 which is an object to be cooled, a GM refrigerator 10 for cooling this superconductive magnet 31 at ultra-low temperatures, and a plurality of heat shielding members 32 disposed so as to surround the superconductive magnet 31, these components being disposed within the a vacuum container 33. The aforementioned plurality of the heat shielding members 32 are supported in the vacuum container 33 through a supporting member 34. Further, there is provided a heat switch 35 for thermally cutting off a cooling means such as the refrigerator 10 from an already cooled object.

As the aforementioned heat shielding member 32, a copper (Cu) plate having a thickness of 1–2 mm is widely used. To suppress invasion of heat from outside so as to increase cooling efficiency of the overall cold reserving system, the heat shielding members 32 are disposed in multiple layers.

However, different from the conventional GM refrigerator in which the refrigerating cycle is as low as several Hz, in such a refrigerator carrying out high-speed cycle operation like starling refrigerator or pulse tube refrigerator in which the refrigerating cycle is several 10 Hz, a pressure loss in the cold accumulating unit filled with the aforementioned spherical magnetic particles increases so that heat exchange between the operating medium and magnetic particles becomes insufficient. Therefore, the conventional refrigerator has a problem in which a sufficient refrigerating capacity cannot be exerted.

On the other hand, as a measure for reducing the pressure loss in the aforementioned cold accumulating unit, there has been used as a trial such a method in which the magnetic cold accumulating materials formed in the form of a punched plate or ribbon-shaped plate having a plurality of through holes are wound in the form of a roll or such a method in which mesh-shaped cold accumulating materials are stacked in multiple layers so as to form a laminated screen.

However, because the aforementioned magnetic cold accumulating material has a very high brittleness particular in intermetallic compounds, drilling or bending is very hard, and therefore it is substantially difficult to reduce the pressure loss in the cold accumulating unit by the shape of the cold accumulating material.

On the other hand, if a refrigerator is stopped or low temperature liquefied gas such as helium (He) is evaporated in the conventional low temperature cold reserving unit using copper-made heat shielding material, the temperature of the heat shielding material rises for a short time because the specific heat of copper under low temperatures is small so that an effect of preventing heat invasion from outside is lost.

Further, recently, there has been considered a system in which the cooling means is separated from an already cooled object and such an object to be cooled as the superconductive magnet is operated in a compact condition. However, because the conventional heat shielding material made of only metallic material such as copper has a small specific heat, its cold reservation effect is small so that an object to be cooled cannot be maintained at low temperatures for a long time.

As a countermeasure for the above mentioned problem, the inventors of this invention have considered application of magnetic cold accumulating material made of intermetallic compound containing rare earth elements and transition metallic elements indicating a large specific heat particularly in extremely low temperature range such as $Er_3Ni$, ErNi, $HoCu_2$ to composition material of the heat shielding material. However, because generally the magnetic cold accumulating material is brittle, it is very difficult to process to a sheet-like shape having such a size which is used as the heat shielding material.

A cylindrical heat shielding material as shown in FIG. 10 is preferable for an object to be cooled such as the superconductive coil, and however, processing of the brittle magnetic cold accumulating material to a cylindrical shape or curved shape is more difficult as compared to processing to a flat shape.

On the other hand, the magnetic cold accumulating material made of rare earth elements such as Nd has an inferior specific heat characteristic than the magnetic cold accumulating material made of the intermetallic compound. Further, such material has a relatively larger specific heat in extremely low temperature as compared to ordinary metals such as Cu and can be processed to a sheet like shape. However, generally, the heat shielding material is often used in a relatively large area shape and used under a condition in which the heat shielding material is subjected to application of a large load. However, because the structural strength of the heat shielding material made of single rare earth element such as Nd is insufficient, it cannot be applied to the heat shielding material without any treatment.

The present invention has been achieved to solve the above described problems and a first object of the invention is to provide a cold accumulating material for extremely low temperature cold capable of exerting a sufficient refrigerating performance with a small pressure loss of refrigerant (operating medium) and easy to process to a shape reducing the pressure loss, and a refrigerator using the same.

A second object of the invention is to provide a heat shielding member which is capable of preventing an invasion of heat effectively, easy to process to any shape and has an excellent structural strength.

DISCLOSURE OF THE INVENTION

To achieve the above object, the cold accumulating material for extremely low temperature cold according to the present invention is so formed that pores of a porous carrier thereof are filled with magnetic particles containing a rare earth element. Preferably the porous carrier is composed of a sheet-shaped porous metal or meshed metal. Preferably, the porosity of the porous carrier is 90% or more. Further, preferably the porous carrier is composed of a foamed metal. Further preferably the porous carrier is formed in the form of a sheet and a plurality of convex portions are formed on at least one surface of the porous carrier.

Preferably, a cold accumulating material for extremely low temperature cold is formed in such a way that magnetic particles containing a rare earth element are mixed with binding agent, solvent, dispersant and plasticizer so as to prepare uniform slurry and the magnetic particles are bonded to each other by forming the obtained slurry in the form of a sheet. A cold accumulating material for extremely low temperature cold wherein magnetic particles containing rare earth elements are mixed with the binder, solvent, dispersant and plasticizer so as to prepare uniform slurry and the magnetic particles are bonded to each other by forming the obtained slurry in the form of a sheet. Further, preferably, a plurality of gas-passing holes are disposed in the sheet-shaped molded object comprising the magnetic particles.

The refrigerator according to the present invention includes a cold reserving unit loaded with the extremely low temperature cold accumulating material formed by filling the pores of the porous carrier with magnetic particles containing the aforementioned a rare earth element.

Preferably the cold accumulating material for extremely low temperature colds formed in the sheet like shape are loaded in the cold accumulating unit such that they are wound in the form of a roll. Further, the cold accumulating material for extremely low temperature cold is formed of a plate-shaped cold accumulating element having a plurality of air passing holes and a plurality of the cold accumulating elements are stacked in multiple layers in the axial direction of the cold accumulating unit.

The heat shielding material for extremely low temperatures according to the present invention is formed by bonding the cold accumulating material for extremely low temperature cold prepared in the above manner to a reinforcement member made of a different material from this cold accumulating material for extremely low temperature cold.

Preferably, the aforementioned reinforcement material is made of metallic material of at least one kind selected from Cu, Al, Fe, Ni or an alloy constituted mainly of the metallic material. Further, the cold accumulating material for extremely low temperature cold is a sheet-shaped cold accumulating material formed by filling the magnetic particles with the pores of the porous carrier together with the binder. Preferably, the cold accumulating material for extremely low temperature cold and reinforcement member are bonded to each other with the aforementioned binder.

The magnetic particles for use in the present invention includes magnetic particles composed of, for example, intermetallic compound containing a rare earth element expressed by
[Expression 1]
general formula:

$$RM_z \quad (1)$$

(In this expression, R indicates at least one kind of rare earth element selected from Y, La, Ce, Pr, Nd, Pm, Sm, Eu, Gd, Tb, Dy, Ho, Er, Tm and Yb and M indicates at least one kind of metallic element selected from Ni, Co, Cu, Ag, Al, Ru, In and Rh and z indicates a number in a range of 0.01–9.0 in atomic ratio. The same meaning is held in the same expression which comes later) and single rare earth element such as Nd. The aforementioned magnetic particle can be prepared by mechanically crushing a mother alloy of a predetermined composition. Further, it may be prepared by processing molten metal containing a rare earth element of a predetermined amount or a molten rare earth element by such a rapid cooling method as centrifugal spray method, rotary disc method (RDP method), inert gas atomizing method, single roll method and double roll method. The shape of the aforementioned magnetic particle may be any shape such as irregular shape or spherical shape.

If a diameter of the magnetic particle exceeds 5 mm, the loading (packing) characteristic to the porous carrier is deteriorated. Therefore, the particle diameter of the magnetic particle is preferred to be less than 5 mm, more preferably the particle diameter thereof is less than 1 mm and more preferably, the particle diameter is less than 0.2 mm.

Preferably, the porous carrier in which the magnetic particles are to be loaded is formed of Ni, Cu, Pb, Fe, stainless steel, Ni alloy, Cu alloy, Pb alloy or Fe alloy which has an excellent processing characteristic and is cheap. Further, the surface of a main body formed of these metals or alloys may be plated with Cr.

The aforementioned porous carrier includes porous metal such as foamed metal and meshed metal formed by weaving metallic wires horizontally and vertically.

The aforementioned porous carrier can be produced according to the following process. That is, the foamed resin containing continuous air bubbles such as urethane is subjected to conductive treatment, the external surface of the foamed resin is electrically plated with metallic components such as Ni, Ni—Cr, Ni—Al, then, this is subjected to heat treatment so as to evaporate resin component and at the same time, subjected to alloying treatment. As a result, the resin parts are converted to pores so that a carrier material of porous metal can be obtained. By processing this carrier material to a sheet-like shape or block-like shape, the porous carrier for use in the present invention can be obtained.

A larger advantage is gained as the porosity of the porous carrier is higher, because a larger amount of magnetic particles having a large volumetric specific heat is loaded under extremely low temperatures. The porosity of the porous carrier is preferred to be more than 20 vol. % and more preferably more than 60 vol. % and further preferably more than 90 vol. %. The porosity of the aforementioned porous carrier can be adjusted freely in a range of 10–98 vol. % by controlling the foam degree of the foam resin in the production process.

The porous carrier prepared as described above can be loaded with a large amount of magnetic particles in parallel to an increase of the porosity. Further because it has a high specific surface area and all the pores communicate, there is produced little air passing resistance so that the pressure loss is very small.

The cold accumulating material for extremely low temperature cold according to the present invention is formed by loading the pores of the porous carrier prepared in the above manner with magnetic particles. In the case when heat exchange between the operating medium and cold reserving material is applied in the cold reserving unit designed for the operating medium passing through an interior of the sheet like cold reserving material to exchange heat directly with the cold reserving material, the ratio (filling rate) of loading the porous carrier with magnetic particles is designed to be 20–90%. If the filling rate is less than 20%, the cold accumulating effect by the magnetic particles is not sufficient although the flow (gas passing) resistance of the operating medium is small. On the other hand, if the filling rate exceeds 90%, the flow resistance of the operating medium increases excessively so that the pressure loss in the cold accumulating unit is increased thereby the cold accumulating effect being reduced.

The filling rate mentioned herein refers to a rate of a volume of the magnetic cold accumulating particles occupying an entire volume (including the porous carrier) of the sheet-shaped cold accumulating material the thickness of which has been finally adjusted by rolling work which will be described later.

In using a cold accumulating unit (gap cold accumulating unit) in which heat exchange between the operating medium and cold accumulating material is not carried by the operating medium passing through an interior of the sheet-shaped cold accumulating material but by the operating medium passing over the surface of a sheet like cold accumulating material having a low flow path resistance with mainly the cold accumulating material, the filling rate of the magnetic particles is 60–92%. Preferably, the filling rate is 65–88% and more preferably 70–85%. If the filling rate is too small, the cold accumulating effect by the magnetic particles is reduced, and if the filling rate is too large, the magnetic particle is distorted by a stress applied upon the filling operation so that the characteristic of the magnetic particle is deteriorated.

By adhering thermoplastic resin such as polyvinyl alcohol (PVA) or thermal hardening resin such as epoxy resin and polyimide to the surface of the porous carrier or magnetic particle as binder, the coupling strength between the magnetic particle and porous carrier can be intensified, so that a possibility that the magnetic particles drop by a vibration or the like is eliminated. As a result, a cold accumulating material for extremely low temperature cold excellent in structural strength can be obtained.

As a method for producing a complex structure by filling the porous carrier with the magnetic particles, a following method can be applied. That is, slurry-like paste is prepared by mixing binder and solvent with magnetic particles prepared by the aforementioned molten metal rapidly cooling method or mechanical crushing method and this paste is equally loaded (uniformly packed) in the porous carrier of porous metal or meshed metal prepared in the above manner and dried in reduced pressure environment at 100–140° C. for 0.5–2.0 hours so as to remove solvent component.

By pressing or rolling the porous carrier filled with the magnetic particles (powder), the coupling strength between the magnetic particles and porous carrier is intensified and the thickness of the cold accumulating material for extremely low temperature cold formed in the sheet-like shape can be adjusted.

The thickness of the aforementioned sheet-shaped cold accumulating material for extremely low temperature cold is in a range of 0.01–2 mm so as to secure an easiness of processing to a predetermined shape by bending. The thickness is preferred to be 0.05–1.0 mm and further it is more preferred to be 0.1–0.5 mm.

By rolling the porous carrier filled with the magnetic particles by means of an embossing roll having an uneven surface, a plurality of convex portions can be formed on a surface of the porous carrier. When this porous carrier having the convex portions is wound so as to form a cylindrical cold accumulating material for extremely low temperature cold, the adjacent porous carriers do not closely contact to each other but are isolated by the convex portions. Thus, in a case when this porous carrier is applied to the aforementioned gap cold accumulating unit, the operating medium (refrigerant) such as He gas can be circulated smoothly through spaces formed by this isolation so that the pressure loss of the operating medium can be reduced.

Further, as a transition metal or various alloys for a composition material of the porous carrier such as the aforementioned porous metal and meshed metal, it is possible to select those having a higher heat conduction (thermal conductivity) under low temperatures than the magnetic cold accumulating material which can be expressed by the aforementioned general formula of $RM_z$. Even if the cold accumulating material for extremely low temperature cold of the present invention composed of the aforementioned porous carrier and magnetic particles is used in the starling refrigerator or pulse tube refrigerator for carrying out high-speed cycle operation reducing heat penetration depth, heat transfer action by the porous metal or meshed metal is exerted sufficiently to the magnetic particles loaded in deep portions of the porous carrier so that heat transfer between the magnetic particles, carrier and operating medium is exerted rapidly.

On the other hand, there may occur a case when heat conduction from high temperature side of the cold accumulating unit to low temperature side thereof is required depending on a design of the cold accumulating unit. In such a case, as a transition metal or various alloys for composing the porous carrier, conversely with the above, it is favorable to utilize a material having a low heat conduction in a low temperature range like stainless. In this selection, any case can be adopted depending on a design of the refrigerator or cold accumulating unit.

When the porous carrier filled with the aforementioned magnetic particles is loaded in the cold accumulating unit, it is possible to wind the porous carrier in the form of a roll or cut the sheet in an appropriate shape. If it is processed in the form of a roll, it is possible to stack a plurality of the carriers having a small width and load them in the cold accumulating unit. When the sheet-shaped carrier is used, two cases can be considered, that is, a case when it is loaded with its surface being substantially parallel to a flow direction of the operating medium and a case when it is loaded with the surface being perpendicular to the flow direction. If it is loaded so that it is perpendicular to the flow direction, the surface needs to be drilled or a material having a low filling density of the magnetic particles needs to be used to secure a flow path of the operating medium.

The cold accumulating material for extremely low temperature cold having the aforementioned structure is formed by filling the pores of the porous carrier having a low air passing resistance and excellent processing characteristics and the magnetic particles having a high brittleness are held by a porous carrier easy to deform. Therefore, the magnetic particles are easy to process to a shape reducing the pressure loss. Therefore, even if this cold accumulating material is used as a cold accumulating material of the cold accumulating unit carrying out high-speed cycle operation such as the starling refrigerator and pulse tube refrigerator, an operation having a low pressure loss and a high heat exchange efficiency is enabled so that a refrigerator having a high refrigerating capacity can be achieved.

Further, it is possible to produce a sheet-shaped or plate-shaped cold accumulating material for extremely low temperature cold by forming crushed powder of the aforementioned magnetic particles to a sheet form or plate form in various methods. That is, the magnetic particles prepared in the above method are crushed to have an average diameter of several $\mu$m (the number of the particles of which diameter is less than 50 $\mu$m is more than 70%) and then binder (binding agent), solvent, dispersant, plasticizer are added to the obtained powder as required and mixed uniformly so as to prepare a slurry.

Although the aforementioned binder is not restricted to a particular one, polyacrylate, polymetacrylate, cellulose acetate, polyvinyl butyral, polyvinyl alcohol (PVA), polyvinyl butyral (PVB), methyl cellulose, polyethylene glycols, carboxymethyl cellulose and the like can be used as the binder. The solvent which can be used includes acetone, toluene, trichloroethylene, ethyl alcohol, ethyl acetate, water and the like. The dispersant which can be used includes glycerol triolate, allyl sulfonic acid, phosphates and various surface active agents (surfactants). The plasticizer to be added to improve the flexibility and processing characteristic of the molded object includes octyl phthalate, butyl benzyl phthalate, glycerin, polyethylene glycols, sucrose acetate isobutylate, di-butyl phthalate, di-isodecyl phthalate and the like.

Then, thus obtained slurry is coated on, for example, a metallic plate or plastic film surface to be formed in the form of a sheet or the slurry is formed in the form of a plate. Although the forming method is not restricted to a particular one, doctor blade method, roll forming method, gravure coating method and the like can be used. The cold accumulating material formed in the form of a sheet or plate is subjected to heat treatment as required so as to evaporate binder and solvent and dry the body.

Different from the conventional cold accumulating material having a high brittleness, the sheet like cold accumulating material formed as described above can be deformed to various shapes. For example, if the sheet-shaped cold accumulating material is wound in the form of a roll and loaded in the cold accumulating unit of a refrigerator, it can be made to function as a cold accumulating material for extremely low temperature cold having a small gas-passing resistance. Then, by changing the winding style of the aforementioned sheet-shaped cold accumulating material, its gas-passing resistance can be changed freely. Particularly because the shape of the sheet-shaped cold accumulating material can be changed so as to reduce the gas-passing resistance, it can be used effectively as a cold accumulating material of a refrigerator carrying out high-speed operation.

Further, it is permissible to dry the aforementioned slurry directly without being coated on anything, form it by press to a plate and use it as a plate-shaped cold accumulating material. That is, if a plurality of gas-passing holes are made in a direction of the thickness of the plate-shaped cold accumulating material and the plate-shaped cold accumulating materials are stacked in multiple layers in the cold accumulating unit through fine spacers, a cold accumulating material having an equalized flow of refrigerant (He gas) and small gas-passing resistance can be obtained.

Although the cross section of the aforementioned gas passing hole is not restricted to any particular shape, a circular shape which facilitates drilling work is preferable. In this case, although the diameter of the gas passing hole is in a range of 10 $\mu$m–1 mm, a range of 20 $\mu$m–300 $\mu$m is particularly preferable. Even if the cross section of the gas passing hole is other case than the circular shape, it is favorable to have a cross section equivalent to the circular shape. Although an interval of arrangement of the aforementioned gas passing holes is set to 20 $\mu$m–2 mm, a range of 30–400 $\mu$m is further preferable. A thickness of the plate-shaped cold accumulating material is preferred to be 0.5–5 mm.

In a case when the cold accumulating material wound in the form of a roll is accommodated in the cold accumulating unit, He gas flows as the refrigerant concentratedly in the gap near a center of the roll, so that the overall flow of the refrigerant is inclined to be unequal. However, in a case when the plate-shaped porous cold accumulating material are stacked in multiple layers, the flow of the refrigerant becomes equal so that the refrigerating effect can be further raised. The gas passing resistance can be adjusted arbitrarily by changing the diameter and disposing pitch of the gas passing holes. When the aforementioned plate-shaped porous cold accumulating materials are stacked in multiple layers, as compared to a case when the conventional spherical magnetic particles are loaded in the same loading rate, the gas passing resistance can be further reduced, so that a higher speed cycle operation of the refrigerator can be achieved.

On the other hand, the heat shielding material according to the present invention is formed by bonding the cold accumulating material for extremely low temperature cold prepared in the above manner to the reinforcement member made of a different material from this cold accumulating material for extremely low temperature cold.

The aforementioned extremely low temperature cold accumulating material is prepared in the following manner.

First, binding agent (binder), solvent and the like are mixed with the magnetic cold accumulating material powder obtained by crushing the magnetic powder having the aforementioned composition so as to prepare a slurry. After that, thus obtained slurry is loaded in the pores of the porous carrier and then solvent components are vaporized so as to form the sheet-shaped cold accumulating material.

Here, heating or evacuating is effective to vaporize the solvent components. As the porous carrier, it is possible to use a meshed metal composed of fiber metal as well as porous metal such as foam metal. As a composition material of the porous carrier, such metallic material as Ni, Cu, Pb, Fe, Al, Ni alloy, Cu alloy, Pb alloy, Fe alloy, Al alloy and stainless steel is preferable.

The porosity of the porous metal or meshed metal is more advantageous as it is higher because more magnetic cold accumulating material having a high specific heat can be loaded therein. Although the porosity is set to more than 20 vol. %, it is favorable that it is more than 60 vol. %, and more than 85 vol. % is further preferable.

The transition metal or alloy composing the aforementioned porous metal or meshed metal has a higher heat conduction in low temperatures than ordinary metallic materials. Therefore, in a case when an object to be cooled is cooled by heat transferred from the refrigerator, the heat conduction efficiency of the porous metal or meshed metal is high so that the magnetic cold accumulating material loaded in the sheet like cold accumulating material can be cooled effectively.

Although the binding agent (binder) for binding the aforementioned magnetic cold accumulating material powder with the porous carrier is not restricted, thermoplastic resin such as polyvinyl alcohol (PVA), carboxymethyl cellulose (CMC) and thermosetting resin such as epoxy resin and polyimide can be preferably used.

As the cold accumulating material for extremely low temperature cold, it is possible to use a cold accumulating material prepared by the molten metal rapidly cooling method mentioned below or a cut or rolled cold accumulating material. Further it is possible to use cold accumulating material processed in the form of thin piece (flake), needle, or powder by processing the molten metal melted under a predetermined composition by such molten metal rapidly cooling method as single roll method, double roll method and centrifugal spray method. In this case, because the thickness of the thin piece or the diameter of needle-shaped or powder-shaped cold accumulating material is less than 0.4 mm, plural thin pieces or the like can be bonded to each other in the thickness direction using adhesive agent (binding agent). Further, the magnetic cold accumulating material composed of only such rare earth element as Nd processed by cutting its ingot or rolling the material in the form of a plate can be also used.

Because generally the magnetic cold accumulating material composed of particularly the intermetallic compound is of brittle material, it is difficult to process to a sheet in industrial scale. However, if the magnetic cold accumulating material is formed in the form of a relatively small area plate or a chip, it can be produced by a method of cutting its ingot or a method of crushing the ingot and sintering the crushed powder.

In this case, an area of each magnetic cold accumulating material is preferred to be in a range of 1–1000 cm$^2$. A large area plate like magnetic cold accumulating material in which this area exceeds 1000 cm$^2$ is difficult to process and has a small mechanical strength, it is liable to be damaged in a process of assembly to the heat shielding member or during an operation. On the other hand, if an object to be cooled having a large area is covered with a plate less than 1 cm² or a chip like magnetic cold accumulating material, the joint between adjacent magnetic cold accumulating materials increases thereby the heat shielding effect being reduced. Therefore, although the area of each magnetic cold accumulating material is in a range of 1–1000 cm², 2–500 cm² is more preferable and 3–100 cm² is further preferable. Preferably, the thickness of the respective magnetic cold accumulating material is 0.5–50 mm.

The reinforcement member to which the aforementioned magnetic cold accumulating material is to be bonded has a function for supporting and reinforcing a magnetic cold accumulating material which cannot be processed to a large configuration or a magnetic cold accumulating material having no sufficient structural strength as well as the heat shielding effect. As the composition material of the aforementioned reinforcement member, not only such metallic materials as Ni, Cu, Fe, Al, Ni alloy, Cu alloy, Fe alloy, Al alloy, stainless steel or the like but also the epoxy resin and fiber reinforced plastic (FRP) can be used. Among the above mentioned composition materials, particularly Cu, Al, Cu alloy and Al alloy are preferable for the reason that their heat conductions are high. Further, Fe base metallic material such as stainless steel is preferable in viewpoints of cheap cost.

The extremely low temperature heat shielding member of the present invention is formed by bonding each of various magnetic cold accumulating materials to the aforementioned reinforcement member integrally. Here, the binding agent (binder) used for bonding the magnetic particles to the porous carrier can be used as adhesive agent for bonding the sheet-shaped magnetic material in which the pores of the porous carrier is filled with the magnetic particles to the reinforcement member.

That is, by bringing the sheet-shaped magnetic cold accumulating material into a contact with the reinforcement member and fixing it thereon before the pores of the porous carrier is filled with a slurry prepared by mixing the magnetic particles with binding agent, solvent and the like and the solvent components are vaporized, the sheet-shaped magnetic cold accumulating material can be integrally bonded to the reinforcement member by the binding agent (binder) which binds the magnetic particles with the porous carrier.

Further, to intensify close-contacting property between the magnetic cold accumulating material and reinforcement member, reduce heat resistance and increase the bonding strength between the both members, screwing the magnetic cold accumulating material to the reinforcement member or binding the reinforcement member to an external surface of the magnetic cold accumulating material using a belt or wire is also effective.

The heat shielding member having the above-described structure can be easily processed to any shape and this heat shielding member is capable of maintaining an object to be cooled at low temperatures for a long time. Particularly, this heat shielding member is capable of improving the temperature stability of an apparatus operated in an extremely low temperature range such as superconductive wire, superconductive device and infrared ray sensor.

BEST MODE FOR CARRYING OUT THE INVENTION

Next, the embodiment of the present invention will be described more concretely with reference to examples mentioned below.

EXAMPLE 1

First, ErNi mother alloy was produced by high frequency melting method. Next, this ErNi mother alloy was mechanically crushed so as to obtain alloy particles of less than 200 meshes. Water solution in which polyvinyl alcohol was dissolved in 4 wt % as a binding material was added to the obtained ErNi alloy particles in a rate of 25% relative to the alloy powder weight and uniformly agitated so as to prepare a slurry-like paste.

On the other hand, a plurality of Ni made porous carriers (product name: Cerumetto, made by Sumitomo Electric Industries ) of 1.6 mm in thickness, 50 mm in width, 400 mm in length having a porosity of 95 vol. % were prepared.

Next, the pores of the aforementioned Ni made porous carrier are equally filled with the slurry-like paste prepared in the above manner and then dried at 120° C. in the reduce pressure atmosphere (1-100 Torr) for an hour so as to evaporate water. As a result, a sheet-shaped cold accumulating material in which the ErNi magnetic particles adhered to the porous carrier through the binding agent was prepared.

Next, the obtained sheet-shaped cold accumulating material was rolled using an embossing roll having an uneven surface and consequently, a sheet-shaped cold accumulating material for extremely low temperature cold having a thickness of 0.8 mm according to the Example 1 was prepared.

Figure 2:
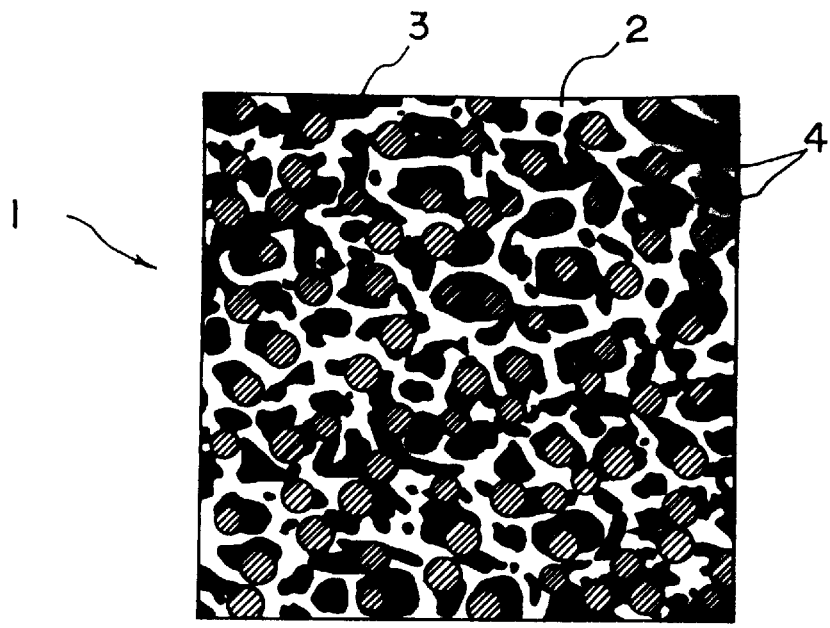
FIG. 2 is a diagram showing a particle structure of the cold accumulating material for extremely low temperature cold according to the present invention and an enlarged view of a portion II of FIG. 1.

The sheet-shaped cold accumulating material for extremely low temperature cold 1 according to the Example 1 has a composition structure in which the pores 3 of the Ni made porous carrier 2 is filled with a plurality of magnetic particles (ErNi alloy powder) as schematically shown in FIG. 2. Each of the magnetic powders 4 is firmly bonded to the porous carrier 2 through polyvinyl alcohol as a binding agent. Further, a bump of 0.05 mm in height (not shown) is formed on the surface of the sheet-shaped cold accumulating material for extremely low temperature cold 1 by rolling by means of the embossing roll.

Next, ends of the obtained sheet-shaped cold accumulating materials for extremely low temperature cold 1 were spot-welded to join plural sheet-shaped cold accumulating materials thereby producing a continuous ribbon-shaped cold accumulating material having a width of 50 mm. Then, thus obtained ribbon-shaped cold accumulating material was wound so as to obtain a roll-shaped cold accumulating material for extremely low temperature cold. In this roll-shaped cold accumulating material, an adjacent sheet-shaped cold accumulating material is isolated from the other by the bump (protrusion) formed on the surface thereof.

Figure 1:
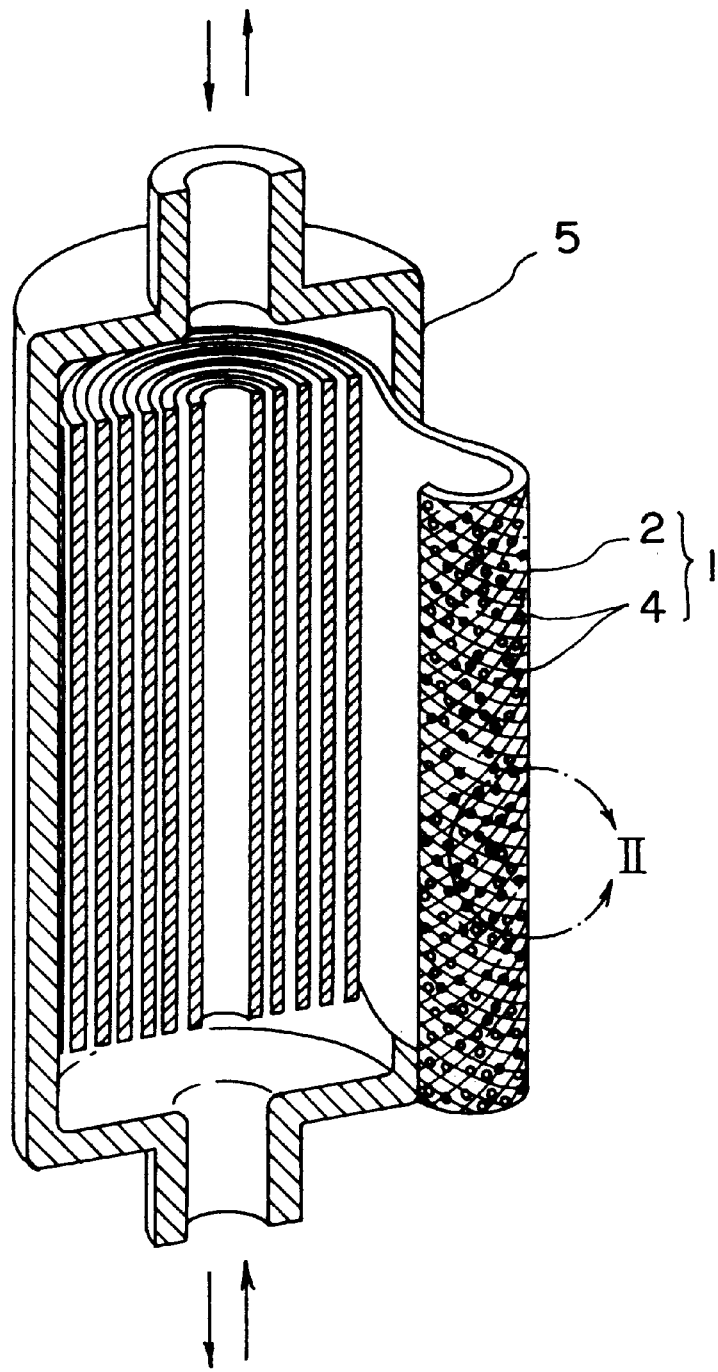
FIG. 1 is a perspective view showing a cutout section of a cold accumulating unit filled with cold accumulating material for extremely low temperature cold according to the present invention.

Then, the above-described roll-shaped cold accumulating materials for extremely low temperature cold 1 were loaded in a cold accumulating unit 5 having an internal diameter of 25 mm and a height of 50 mm as shown in FIG. 1. The loading ratio of the magnetic powder 4 in this cold accumulating unit 5 was 73 vol %. This cold accumulating unit 5 was used as a third cold accumulating unit of a three-stage pulse tube refrigerator and operated at an operating frequency of 10 Hz. As a result, a refrigerating capacity of 0.14 W at 10 K was obtained.

COMPARATIVE EXAMPLE 1

On the other hand, ErNi alloy prepared at the Example 1 was melted and the obtained molten metal was diffused by centrifugal spray method. Immediately after that, it was cooled rapidly and solidified so as to produce spherical magnetic particles. The obtained magnetic particles were sieved and spherical magnetic particles having a diameter of 0.15–0.18 mm were selected. Next, the selected magnetic particles were loaded in the cold accumulating unit 5 (25 mm in internal diameter×50 mm in height) used in the Example 1 shown in FIG. 1. The loading rate of the magnetic powder 4 in this cold accumulating unit 5 was 62 vol %.

Then, the cold accumulating unit 5 filled with the spherical magnetic particles was used as the third cold accumulating unit of the pulse tube refrigerator like the Example 1 and operated under the same conditions. As a result, the no-load temperature did not reach 10 K but was 16 K. That is, a sufficient refrigerating capacity could not be obtained.

EXAMPLE 2

Figure 3:
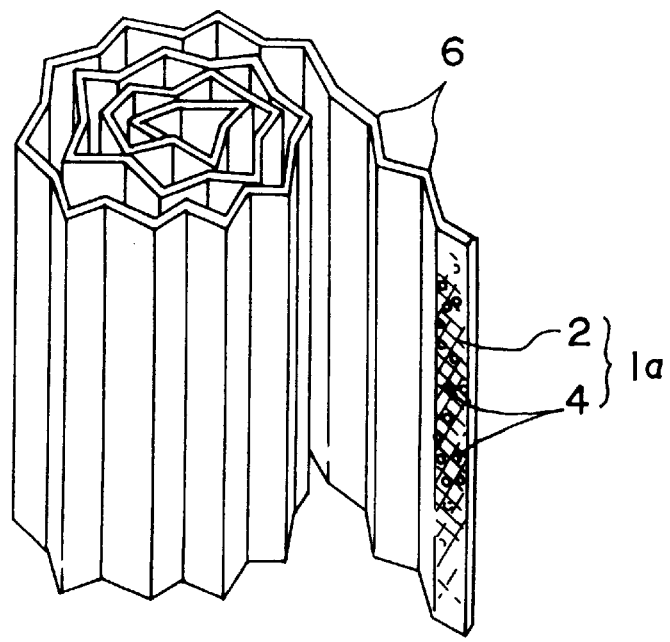
FIG. 3 is a perspective view showing other example of the cold accumulating material for extremely low temperature cold according to the present invention.

FIG. 3 is a perspective view showing a shape and structure of the cold accumulating material for extremely low temperature cold 1a according to the Example 2. This cold accumulating material for extremely low temperature cold 1a was produced by bending the sheet-shaped cold accumulating material prepared in the Example 1 at intervals in the length direction thereof by means of a press so as to create a plurality of convex portions 6. By winding the bent sheet-shaped cold accumulating material as shown in FIG. 3, a sheet-shaped cold accumulating material adjacent in the radius direction is separated by the convex portion 6 thereby reducing a gas flow resistance in the width direction of the sheet-shaped cold accumulating material.

Like the Example 1, the cold accumulating material for extremely low temperature cold 1a according to the Example 2 was loaded in the cold accumulating unit 5 shown in FIG. 1, used as the third cold accumulating unit of the pulse tube refrigerator and operated under the same conditions. As a result, a refrigerating capacity of 0.11 W at 10 K was obtained.

EXAMPLE 3

In the Example 1, ErNi magnetic particles were loaded in Ni made porous carrier having a thickness of 2.0 mm and a diameter of 25 mm and porosity of 97% so as to prepare a sheet-shaped cold accumulating material. A plurality of holes each having a diameter of 0.2 mm were drilled at an interval of 0.5 mm in this sheet-shaped cold accumulating material. This cold accumulating material was loaded in the cold accumulating unit like the Example 1 and operated as the third cold accumulating unit of the pulse tube refrigerator under the same conditions. As a result, a refrigerating capacity of 0.13 W at 10 K was obtained.

In the cold accumulating materials for extremely low temperature cold 1, 1a according to the aforementioned respective embodiments, the operating medium (refrigerant) such as He gas passes through a flow path having a low gas-passing resistance between adjacent sheet-shaped cold accumulating materials so as to carry out heat exchange on the surface of the sheet-shaped cold accumulating material. Therefore, even when high speed cycle operation is carried out, the pressure loss is small and heat exchange rate is high, so that it has been made evident that an excellent refrigerating capacity can be exerted.

Particularly, even if hard processing such as forming a coil or roll by winding is carried out, the porous carrier is freely deformed so that the magnetic particles are seldom broken or damaged. That is, it is possible to create to a shape capable of reducing the pressure loss.

Comparing the Example 1 with Comparative Example, in the case of the Example 1, the loading rate of the magnetic particles relative to the cold accumulating unit could be raised without increasing the pressure loss, and therefore, it is considered that a large difference was produced in the refrigerating capacity.

Although according to the above described embodiment, the sheet like cold accumulating material for extremely low temperature cold was created by loading the magnetic particles in the porous carrier thereby producing complex structure, it is also possible to form the sheet-shaped cold accumulating material for extremely low temperature cold by combining the carrier and magnetic particles in a following method.

That is, it is possible to nip or clamp the magnetic particles between the mild metallic sheets of Pb or the like and press it so as to combine them integrally and form the sheet-shaped cold accumulating material for extremely low temperature cold.

Further, it is permissible to carry out so-called canning which means evacuating and sealing after magnetic particles are loaded in a bag member formed of metallic material such as Ni, Cu, Pb, Al and roll the canned sheet like bag so as to integrally combine the metallic material and magnetic particles and then form the sheet-shaped cold accumulating material for extremely low temperature cold.

Further, it is also permissible to pulverize the magnetic cold accumulating material to fine particles having a diameter of several $\mu$m, add binder and solvent to thus obtained magnetic powder to prepare a slurry, form a sheet-shaped molded form from this slurry according to, for example, doctor blade method or roll forming method and heat this sheet-shaped molded form to evaporate the binder component thereby obtaining the sheet-shaped magnetic cold accumulating material. Further, it is also possible to create a sheet-shaped cold accumulating material having a little gas flow resistance by drilling the above mentioned sheet like molded form.

Further, it is also possible to coat the surface of the magnetic particles with a metal having a low melting point and not reacting with the magnetic particle-like Pb by mechanical alloying method, forming the coated magnetic particles in the form of a sheet, subjecting the obtained formed object to heat treatment to melt the low melting point metal and couple the magnetic particles with each other by this low melting point metal thereby producing the sheet-shaped magnetic cold accumulating material.

Next, the plate like cold accumulating material for extremely low temperature cold produced by molding pulverized magnetic particles will be described with reference to the following examples.

EXAMPLE 4

A mother alloy of magnetic material having such a composition as $HoCu_2$ was prepared by high frequency melting method. This mother alloy was crushed by using jaw crusher, hammer mill, and ball mill successively so as to prepare magnetic alloy powder having an average particle diameter of 10 $\mu$m. Relative to alloy powder weight, acrylic resin of 7 wt % as binder, methyl isobutyl ketone (MIBK) of 70 wt % as solvent and di-butyl phthalate of 2.8 wt % as plasticizing agent were added to this magnetic alloy powder and mixed with alumina ball by a pot roller for 24 hours so as to prepare a uniform slurry.

Figure 4:
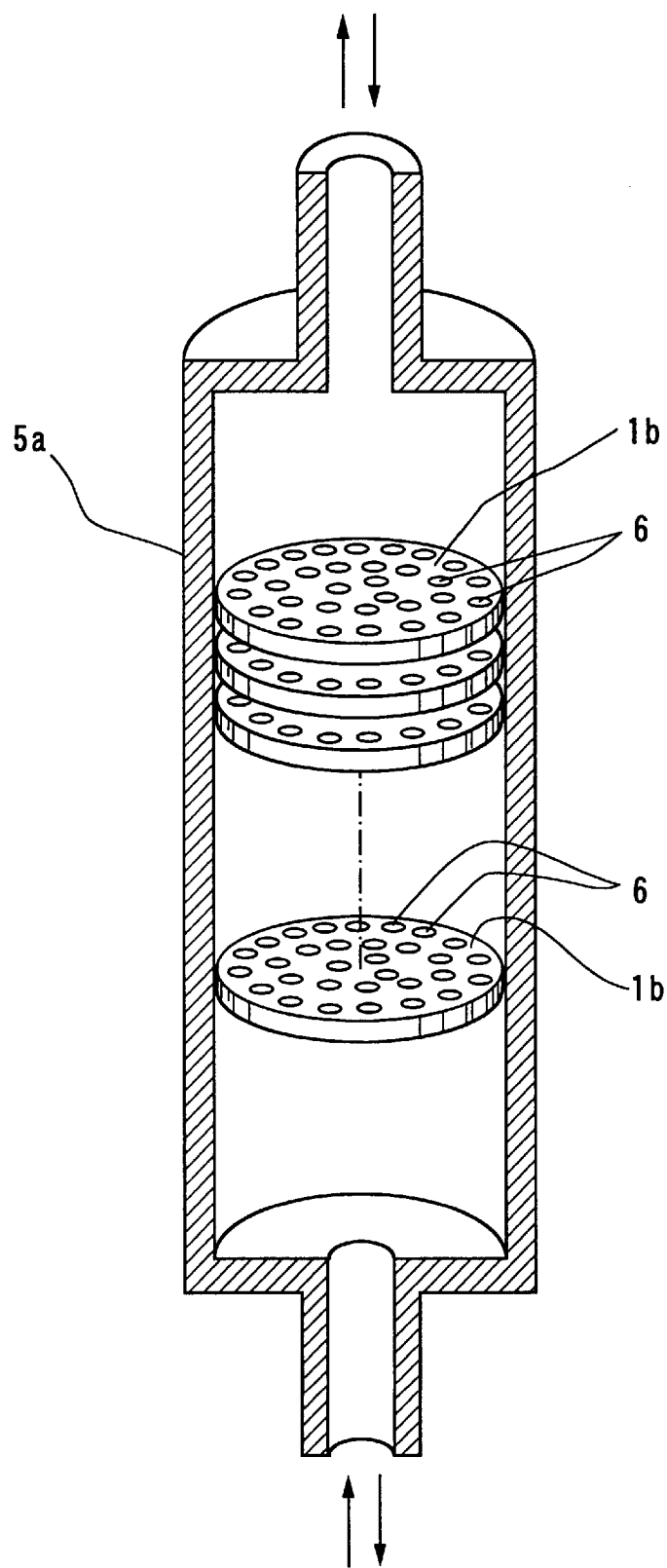
FIG. 4 is a perspective view showing a cutout section of a cold accumulating unit filled with the cold accumulating material for extremely low temperature cold according to other example of the present invention.

After the obtained slurry was dried, it was sieved with #60 sieve so as to adjust the particle diameter. This dried powder was loaded in a mold and molded by a molding pressure of 180 kg/cm$^2$ so as to produce a plate like cold accumulating material having a diameter of 28 mm and a thickness of 1 mm. Further, as shown in FIG. 4, gas passing holes (through hole) of 100 $\mu$m in diameter were mechanically drilled at a pitch of 200 $\mu$m in this plate-shaped cold accumulating material. Further, the obtained cold accumulating material plate having a plurality of the holes was degreased in nitrogen gas environment at 700° C. for two hours so as to produce a plate-shaped porous cold accumulating material 1b.

Then, thus obtained 50 pieces of the plate-shaped porous cold accumulating materials 1b were stacked in multi-layers in the axial direction of the second stage cold accumulating unit 5a of the 2-stage expansion type pulse tube refrigerator as shown in FIG. 4 with a teflon made mesh material inserted in each gap between the plates as a spacer in a process of assembly of a refrigerator. This refrigerator was operated at the frequency of 20 Hz. As a result, the no-load temperature reached 4.0 K and an excellent refrigerating capacity was obtained.

COMPARATIVE EXAMPLE 2

The mother alloy ($HoCu_2$) prepared in the Example 4 was melted and the obtained molten metal was dispersed and rapidly cooled and solidified by centrifugal spray method (RDP) so as to prepare spherical magnetic particles. Thus obtained magnetic particles were sieved to select spherical magnetic particles having diameter of 0.15–0.18 mm. The magnetic particles were loaded in the second stage cold accumulating unit 5a of the pulse tube refrigerator used in the Example 4 and a refrigeration test was carried out under the same conditions as the Example 4. The no-load temperature was 13.2 K.

EXAMPLE 5

A mother alloy of magnetic material having such a composition as $Er_3Ni$ was prepared by high frequency melting method. This mother alloy was crushed by using jaw crusher, hammer mill, and ball mill successively so as to prepare magnetic alloy powder having an average particle diameter of 8 $\mu$m. Relative to alloy powder weight, acrylic resin of 6 wt % as binder, methyl isobutyl ketone (MIBK) of 70 wt % as solvent and di-butyl phthalate of 2.5 wt % as plasticizing agent were added to this magnetic alloy powder and mixed with alumina ball by a pot roller for 24 hours so as to prepare a uniform slurry.

Next, the obtained slurry was formed according to doctor blade method so as to prepare a long sheet-shaped cold accumulating material having a width of 60 mm and a thickness of 300 $\mu$m.

Next, gas passing holes (through hole) of 200 $\mu$m in diameter were mechanically drilled at a pitch of 300 $\mu$m in this sheet-shaped cold accumulating material. Thus obtained porous sheet-shaped cold accumulating material was wound so as to obtain a roll-shaped cold accumulating material having a diameter of 28 mm and a height of 60 mm, and then degreased in nitrogen gas environment at 700° C. for two hours so as to produce an cold accumulating material for extremely low temperature cold according to the Example 5.

Such a roll-shaped cold accumulating material for extremely low temperature cold according to the Example 5 was loaded in the second stage cold accumulating unit of the two-stage expansion type pulse tube refrigerator in a process of assembly of a refrigerator. Then, this refrigerator was operated at the frequency of 20 Hz. As a result, the no-load temperature reached 4.5 K and an excellent refrigerating capacity was obtained.

COMPARATIVE EXAMPLE 3

The mother alloy ($Er_3Ni$) prepared in the Example 5 was melted and the obtained molten metal was dispersed, rapidly cooled and solidified by centrifugal spray method (RDP) so as to prepare spherical magnetic particles. The obtained magnetic particles were sieved to select spherical magnetic particles having diameter of 0.15–0.18 mm. The magnetic particles were loaded in the second stage cold accumulating unit of the pulse tube refrigerator used in the Example 5 and the refrigeration test was carried out under the same conditions as the Example 5. As a result, the no-load temperature was 17.0 K.

EXAMPLE 6

Nd molten metal was dispersed and cooled rapidly according to Ar gas atomizing method so as to prepare magnetic powder. The obtained powder was sieved to select particles having a particle diameter of less than 100 $\mu$m. Water solution in which polyvinyl alcohol was dissolved in 2 wt % concentration as binder was added to the obtained Nd powder 20% per powder weight and kneaded uniformly so as to prepare slurry-like paste.

On the other hand, a plurality of Ni made porous carriers (product name: Cerumetto, made by Sumitomo Electric Industries) of 1.6 mm in thickness, 50 mm in width, 400 mm in length having a porosity of 95 vol. % were prepared.

Next, the pores of the aforementioned Ni made porous carrier are equally filled with the slurry-like paste prepared in the above manner and then dried at 120° C. in the reduce pressure atmosphere (1–100 Torr) for an hour so as to evaporate water. As a result, a sheet-shaped cold accumulating material in which the Nd magnetic particles adhere to the porous carrier through the binding agent was prepared.

Next, the obtained sheet-shaped cold accumulating material was rolled using an embossing roll having an uneven surface and consequently, a sheet-shaped cold accumulating material for extremely low temperature cold having a thickness of 0.8 mm according to the Example 6 was prepared.

A bump of 0.05 mm in height is formed on the surface of the sheet-shaped cold accumulating material for extremely low temperature cold according to the Example 6 by rolling by means of the embossing roll.

Next, ends of the obtained sheet-shaped cold accumulating materials for extremely low temperature cold 1 were spot-welded to join plural sheet-shaped cold accumulating materials thereby producing a ribbon-shaped cold accumulating material having a width of 50 mm. Then, the obtained ribbon-shaped cold accumulating material was wound so as to obtain a roll-shaped cold accumulating material for extremely low temperature cold. In this roll-shaped cold accumulating material, an adjacent sheet-shaped cold accumulating material is isolated from the other by the bump (protrusion) formed on the surface thereof.

Then, the above described roll-shaped cold accumulating material for extremely low temperature cold was loaded in a cold accumulating unit having an internal diameter of 25 mm and a height of 50 mm. This cold accumulating unit was used as the second stage cold accumulating unit of the two-stage pulse tube refrigerator and operated at an operating frequency of 20 Hz. As a result, the no-load temperature was 6.3 K and an excellent refrigerating capacity was obtained.

COMPARATIVE EXAMPLE 4

On the other hand, a round bar having a diameter of 50 mm and a height of 300 mm was produced using Nd prepared in the Example 6. Nd molten metal was dispersed according to rotational electrode process (REP) in which the obtained Nd round bar was used as an electrode and melted, at the same time, cooled rapidly and solidified so as to prepare spherical magnetic particles. The obtained magnetic particle groups were sieved so as to select spherical magnetic particles having a diameter of 0.15–0.18 mm. Next, the selected magnetic particles were loaded in the cold accumulating unit (25 mm in internal diameter×50 mm in height) used in the Example 6.

Then, the cold accumulating unit filled with the spherical magnetic particles was used as the second cold accumulating unit of the pulse tube refrigerator as like the Example 6 and operated under the same condition. As a result, the no-load temperature did not reach 6.3 K but was 18.2 K. Therefore, a sufficient refrigerating capacity could not be obtained.

Next, the heat shielding member for extremely low temperature cold according to the present invention will be described with reference to the following examples.

EXAMPLE 7

HoCu$_2$ mother alloy was produced by high frequency melting method. Next, this HoCu$_2$ mother alloy was mechanically crushed so as to obtain alloy powder of less than 200 mesh. Next, water solution in which polyvinyl alcohol was dissolved in 4 wt % concentration as binder was added to the obtained HoCu$_2$ alloy powder in a rate of 25% relative to alloy powder weight and kneaded uniformly so as to prepare a slurry-like paste. On the other hand, a plurality of Ni made porous carriers (product name: Cerumetto, made by Sumitomo Electric Industries) having a thickness of 1.6 mm, width of 50 mm and length of 400 mm and porosity of 95 vol. % were prepared.

Next, the pores of the above described Ni made porous carrier was equally filled with the prepared slurry-like paste so as to prepare a sheet-shaped cold accumulating material 36a.

Figure 5:
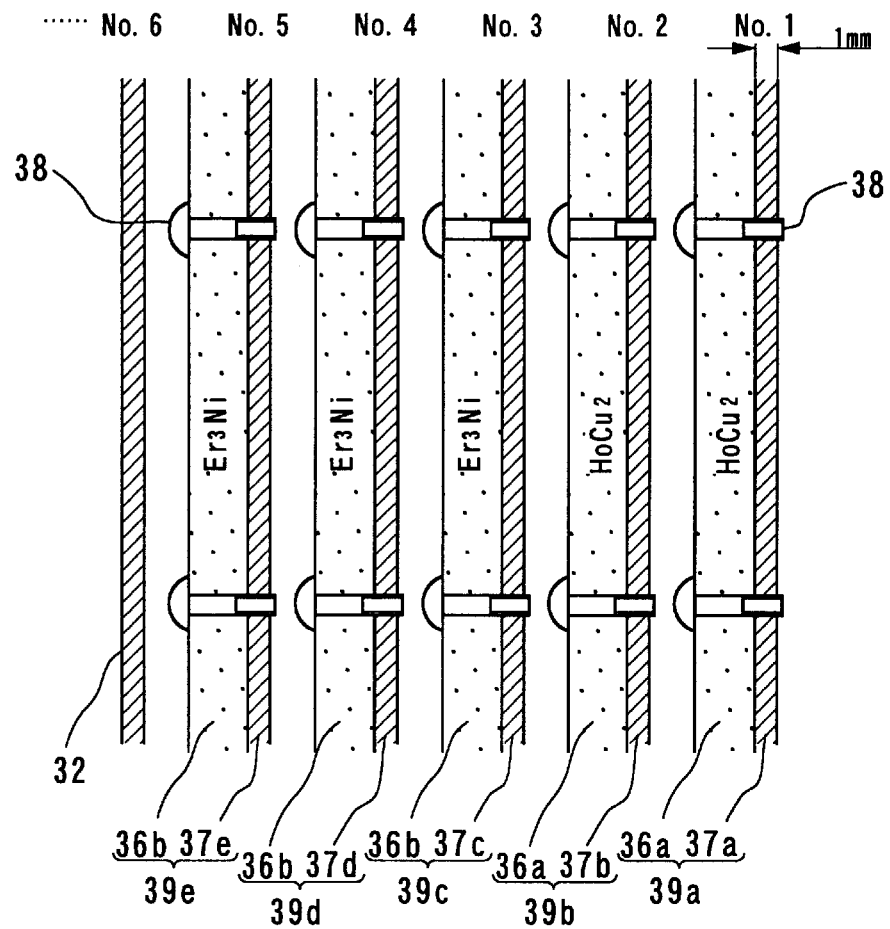
FIG. 5 is a sectional view showing an example of a heat shielding member according to the present invention.

On the other hand, as shown in FIG. 5, a bottomed cylindrical reinforcement member (for a first layer) 37a having a diameter of 200 mm×height of 300 mm and a reinforcement member 37b (for a second layer) having a diameter of 230 mm and height of 350 mm, both being made of Cu material having a thickness of 1 mm were prepared. Before the binder of the aforementioned sheet-shaped cold accumulating material 36a was dried, the sheet-shaped cold accumulating agent 36a was bonded to an external surface of the respective reinforcement members 37a, 37b. That is, an excessive amount of the aforementioned paste was coated between the respective sheet-shaped cold accumulating material 36a and the reinforcement members 37a, 37b made of Cu such that it exuded through the Ni made porous carrier and the sheet-shaped cold accumulating material 36a was bonded with the reinforcement members 37a, 37b made of Cu by adhesive force of polyvinyl alcohol which was a binding component in the paste.

Further, to improve the heat transfer between the sheet-shaped cold accumulating material 36a and the reinforcement members 37a, 37b, the sheet-shaped cold accumulating member 36a was fixed by screws 38. After that, this was dried in reduced pressure atmosphere at 120° C. for an hour and consequently, as shown in FIG. 5, heat shielding members 39a, 39b in which the sheet-shaped cold accumulating member 36a and reinforcement members 37a, 37b were bonded to each other were prepared.

On the other hand, magnetic particles made of Er$_3$Ni instead of the aforementioned HoCu$_2$ was loaded in the pores of the Ni made porous carrier so as to prepare the sheet-shaped cold accumulating material 36b as shown in FIG. 5. Further, as shown in FIG. 5, a bottomed cylindrical reinforcement member (for a third layer) 37c having a diameter of 260 mm×height of 400 mm, a bottomed cylindrical reinforcement member (for a fourth layer) 37d having a diameter of 290 mm×height of 450 mm and a bottomed cylindrical reinforcement member (for a fifth layer) having a diameter of 310 mm and height of 500 mm, each made of Cu material having a thickness of 1 mm were prepared.

Then, the sheet-shaped cold accumulating material 36b containing Er$_3$Ni magnetic particles was bonded to the external surface of the respective reinforcement members 37c, 37d, 37e integrally, and consequently, the heat shielding members 39c, 39d, 39e as shown in FIG. 5 were prepared.

Figure 10:
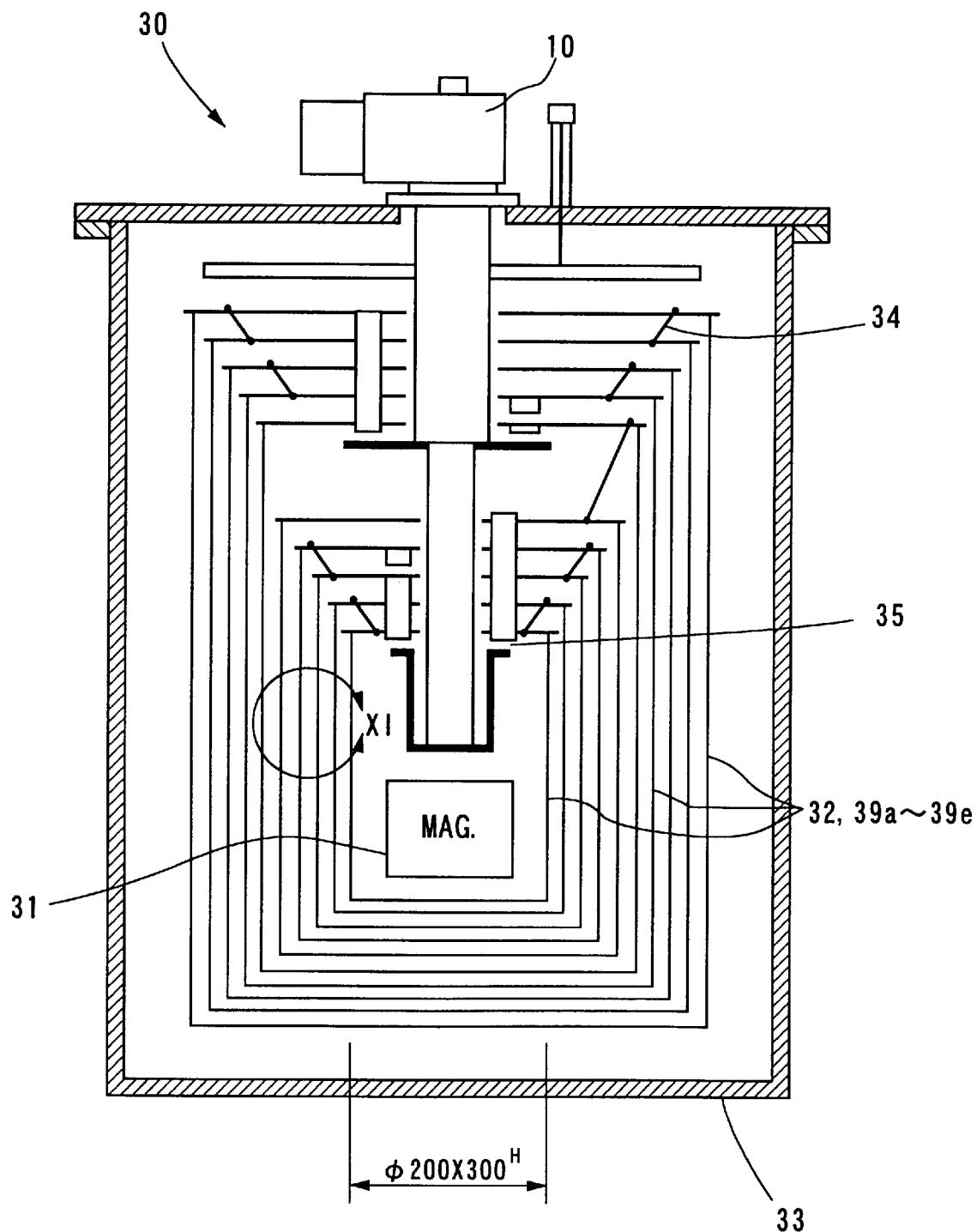
FIG. 10 is a sectional view showing an example of a structure of a cold reservation unit using the GM refrigerator and heat shielding member and FIG. 11 is an enlarged sectional view of a portion XI in FIG. 10.
Figure 11:
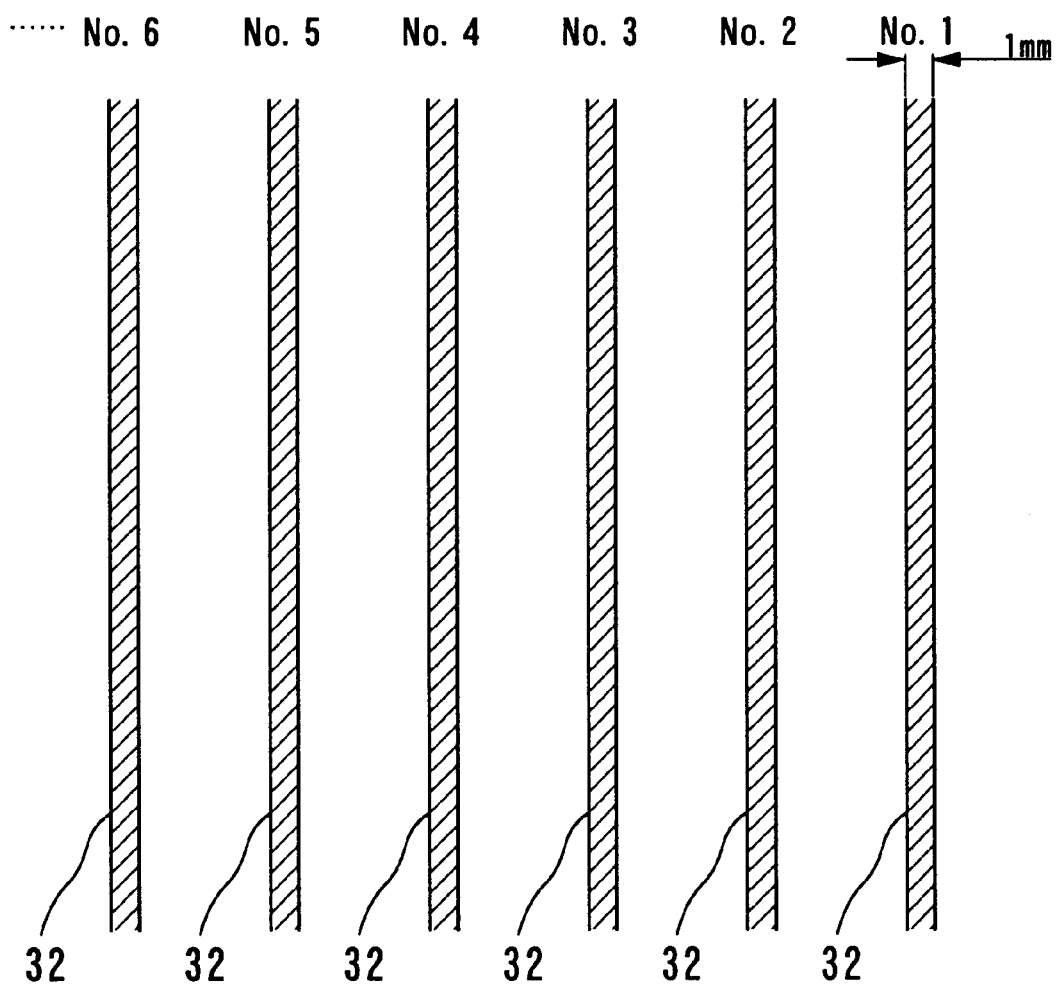

The heat shielding members 39a–39e for the first layer-fifth layer prepared as described above were disposed coaxially in the vacuum container 33 as a heat shielding member of the low temperature cold reserving unit 30 shown in FIG. 10 so as to produce a low temperature cold accumulating unit for cooling a superconductive magnet 31. Meanwhile, as the heat shielding members for the sixth layer–tenth layer, the conventional heat shielding members 32 made of Cu material having a thickness of 1 mm alone were disposed coaxially as shown in FIG. 11.

In the low temperature cold reserving unit 30 assembled in the above manner, totally ten layers of the heat shielding members 39a–39e, 32—32 were cooled by the two-stage cooling type GM (Gifford MacMahon) refrigerator 10. After that, the heat switch 35 was turned off to separate a thermal contact between the GM refrigerator 10 and heat shielding member. In this condition, the surface temperature of the heat shielding member 39a was measured. As a result, the temperature which arrived at 4.0 K by the cooling operation of the GM refrigerator 10 still remained at 5.0 K 100 hours after the GM refrigerator 10 was separated and thus, an excellent heat shielding performance could be confirmed.

EXAMPLE 8

HoCu$_2$ alloy ingot was prepared by high frequency melting method, this ingot was mechanically cut and subjected to grinding work so as to prepare a plurality of chip like magnetic cold accumulating materials each 20 mm vertically, 20 mm horizontally and 3 mm thick.

On the other hand, a bottomed cylindrical reinforcement member having the same size as the reinforcement members 37a, 37b for the first layer and second layer used in the Example 7 was prepared. Among the aforementioned chip-shaped magnetic cold accumulating materials, the chip-shaped magnetic cold accumulating material to be joined to a side of the aforementioned reinforcement member was subjected to finishing work to produce a curved surface coinciding with a curvature of the side of the reinforcement member. On the other hand, the chip-shaped magnetic cold accumulating material to be joined to a bottom of the reinforcement member was kept flat.

The chip-shaped magnetic cold accumulating material finished to the curved surface was bonded to a side of the aforementioned reinforcement member (made of Cu) through ethyl-2-cyanoacrylate adhesive instantaneous adhesive agent (Aron Alfa: made by Toa Gousei Chemical Industry Co.,Ltd) and the flat chip-shaped magnetic cold accumulating material was bonded to the bottom of each reinforcement member in the same manner. Because the square-shaped chip-like magnetic cold accumulating member was incapable of a circular bottom of each reinforcement member, a chip coming out of the periphery of the bottom was finished to a shape of that periphery. As a result, a heat shielding member (for the first and second layers) in which the chip-shaped magnetic cold accumulating material was bonded to the reinforcement member integrally was prepared.

On the other hand, by bonding the chip-shaped magnetic cold accumulating material made of Er$_3$Ni processed in the same manner to the side and bottom of the reinforcement members (for the third–fifth layers) made of Cu prepared in the Example 7, the heat shielding materials for the third layer–fifth layer were prepared.

By disposing the heat shielding members for the first layer–fifth layer prepared in the above manner coaxially in the vacuum container 33 as heat shielding member for the low temperature cold reserving unit 30 shown in FIG. 10, a low temperature cold reserving unit for cooling the superconductive magnet 31 was assembled. As the heat shielding members for the sixth layer–tenth layer, the conventional heat shielding members 32 made of only Cu material having a thickness of 1 mm were disposed coaxially as shown in FIG. 11.

In the low temperature cold reserving unit 30 assembled as described above, totally ten layers of the heat shielding members were cooled by the two-stage cooling type GM (Gifford MacMahon) refrigerator 10 and after that, the heat switch 35 was turned off so as to separate a thermal contact between the GM refrigerator 10 and heat shielding members. Then, in this condition, the surface temperature of the heat shielding material was measured. As a result, by the cooling operation of the GM refrigerator 10, the temperature which arrived at 4.0 K still remained at 6.7 K even 100 hours after the GM refrigerator 10 was separated, and an excellent heat shielding characteristic was confirmed.

EXAMPLE 9

Nd metallic lump was hot-rolled in inert gas environment so as to prepare a sheet-shaped magnetic cold accumulating material having a thickness of 3 mm. On the other hand, the aforementioned sheet-shaped magnetic cold accumulating material was bonded to the external surface of the Cu made reinforcement members of the first layer–fifth layer prepared in the Example 7 using epoxy adhesive agent (Sumikadain: made by Sumitomo Kagaku Kogyo Kabushiki Kaisha). To improve heat transfer between the respective Nd made magnetic cold accumulating material and Cu made reinforcement member, both the members were screwed together with fixing screws 38 in the same method as shown in FIG. 5.

The heat shielding members for the first layer–fifth layer prepared in the above manner were disposed coaxially in the vacuum container 33 as heat shielding member of the low temperature cold reserving unit 30 shown in FIG. 10 to assemble a low temperature cold reserving unit for cooling the superconductive magnet 31. As the heat shielding members of the sixth layer–tenth layer, the conventional heat shielding members 32 made of only Cu material having a thickness of 1 mm as shown in FIG. 11 were disposed coaxially.

In the low temperature cold reserving unit 30 assembled as described above, totally ten layers of the heat shielding members were cooled by the two-stage cooling type GM (Gifford MacMahon) refrigerator 10 and after that, the heat switch 35 was turned off so as to separate a thermal contact between the GM refrigerator 10 and heat shielding members. Then, in this condition, the surface temperature of the heat shielding member was measured. As a result, by the cooling operation of the GM refrigerator 10, the temperature which arrived at 4.0 K still remained at 8.2 K even 100 hours after the GM refrigerator 10 was separated and an excellent heat shielding characteristic was confirmed.

COMPARATIVE EXAMPLE 5

A low temperature cold reserving unit of the Comparative Example 5 was assembled by the same structure as the Example 7 except that the all the heat shielding members of the first layer–tenth layer were configured of the conventional heat shielding members made of only Cu material having a thickness of 1 mm as shown in FIG. 11.

In the low temperature cold reserving unit 30 assembled as described above, totally ten layers of the heat shielding members were cooled by the two-stage cooling type GM (Gifford MacMahon) refrigerator 10 and the heat switch 35 was turned off so as to separate a thermal contact between the GM refrigerator 10 and heat shielding member. In this condition, the surface temperature of the heat shielding member was measured. As a result, by the cooling operation of the GM refrigerator 10, the temperature which arrived at 4.0 K rose to 22 K rapidly 100 hours after the GM refrigerator 10 was separated and it was confirmed that the heat shielding effect was low.

The above described examples show heat shielding members in which a sheet like or chip like magnetic cold accumulating material was bonded to the external surface of the reinforcement member made of Cu integrally. The magnetic cold accumulating material is capable of exerting the same heat shielding characteristic even if it is bonded to either outside or inside of the reinforcement member.

Figure 6:
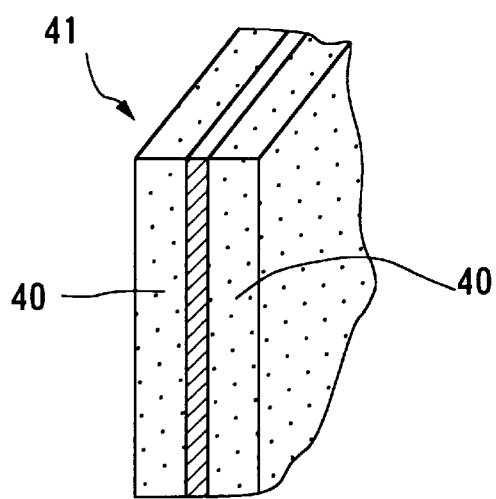
FIG. 6 is a perspective view with a section showing other example of the heat shielding member according to the present invention.
Figure 7:
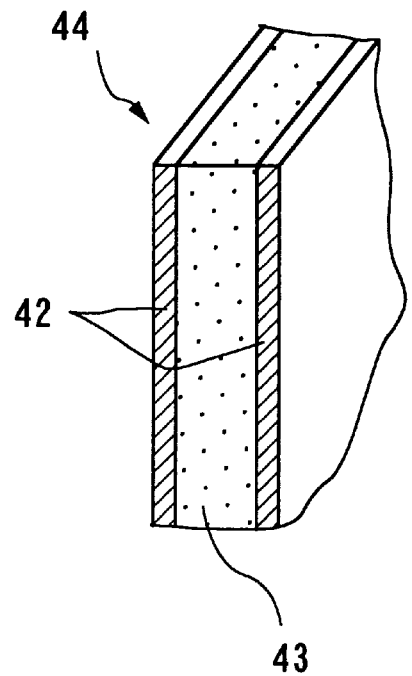
FIG. 7 is a perspective view with a section showing other example of the heat shielding member according to the present invention.
Figure 8:
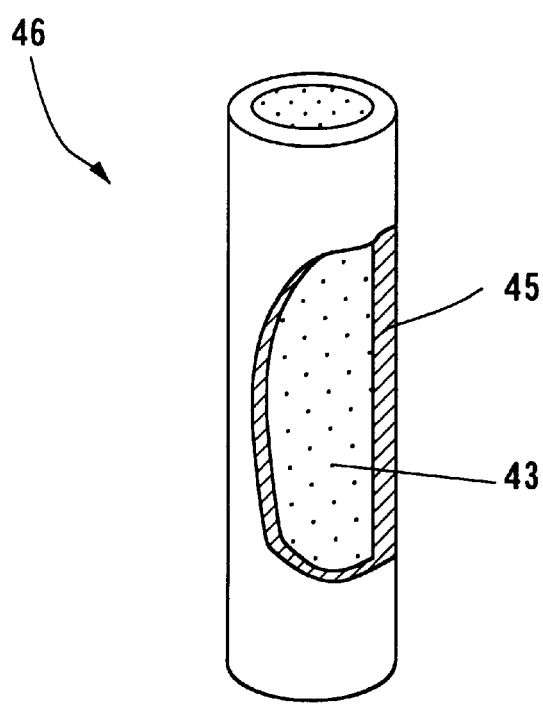
FIG. 8 is a perspective view showing other example of the heat shielding member according to the present invention.
Figure 9:
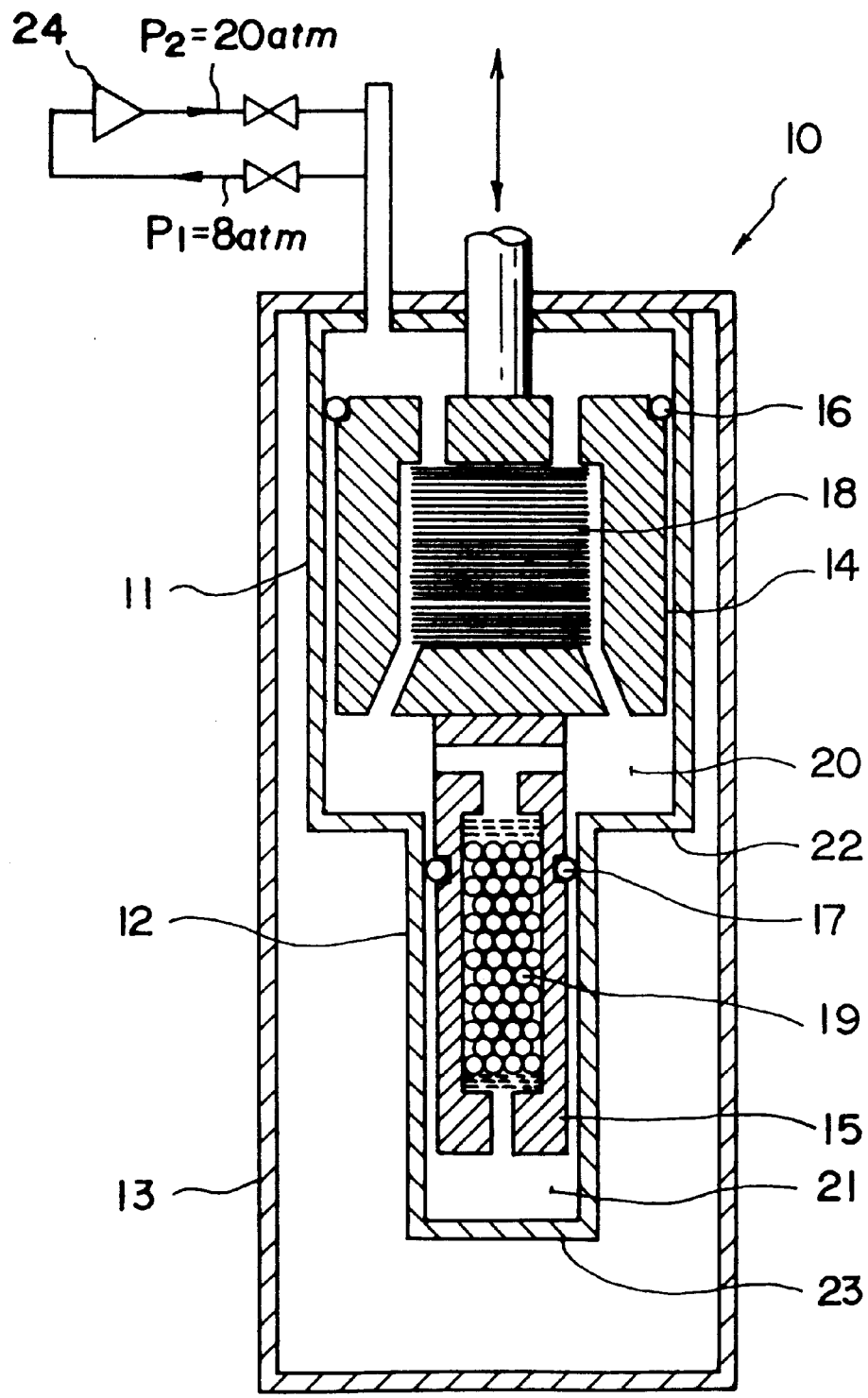
FIG. 9 is a sectional view showing major parts of a GM refrigerator.

By bonding a magnetic cold accumulating material 40, 40 on both sides of the reinforcement member 37 as shown in FIG. 6, a heat shielding member 41 excellent in heat shielding characteristic providing a high cold accumulating effect was obtained. Further, it is permissible to form a heat shielding member 44 having double structure of the reinforcement members 42 and having cold accumulating powder 43 contained therebetween as shown in FIG. 7. Further, it is also permissible to form a heat shielding material 46 in which the cold accumulating powder 43 was loaded in a pipe-shaped reinforcement material 45 as shown in FIG. 8. In this case, the binder may be mixed with the cold accumulating powder 43 as required.

The heat shielding members according to the above described Examples can be processed to an arbitrary shape and are capable of maintaining an object to be cooled under low temperatures for a long time, so that the temperature stability of an apparatus operating under extremely low temperatures such as a superconductive wire, superconductive device, infrared ray sensor and the like can be improved largely.

INDUSTRIAL APPLICABILITY

As described above, the cold accumulating material for extremely low temperature cold according to the present invention is formed by filling the pores of the porous carrier excellent in processing characteristic having a low gas-passing resistance with magnetic particles so that the magnetic particles having a high brittleness are supported by the porous carrier easy to deform. Therefore, this material is easy to process to a shape having a small pressure loss such that the magnetic particles are not cracked or damaged. Therefore, if the material is used as a cold accumulating material for a refrigerator operated in high speed cycles such as the starling refrigerator and pulse tube refrigerator, an operation having a small pressure loss and a high heat exchange efficiency is enabled so that a refrigerator having a high refrigerating capacity can be realized.

Further, the heat shielding member according to the present invention can be easily processed to an any shape and is capable of maintaining an object to be cooled under low temperatures for a long time.

We claim:

1. A cold accumulating material for extremely low temperature cold wherein pores of a porous carrier thereof are filled with magnetic particles containing rare earth element.

2. A cold accumulating material for extremely low temperature cold according to claim 1, wherein said porous carrier is made of a sheet-shaped porous metal or a meshed metal.

3. A cold accumulating material for extremely low temperature cold according to claim 1, wherein a porosity of said porous carrier is 90% or more.

4. A cold accumulating material for extremely low temperature cold according to claim 1, wherein said porous carrier is a foamed metal.

5. A cold accumulating material for extremely low temperature cold according to claim 1, wherein said porous carrier is formed in a form of a sheet and a plurality of convex portions are formed on at least one surface of said porous carrier.

6. A cold accumulating material for extremely low temperature cold wherein magnetic particles containing a rare earth element are mixed with binder, solvent, dispersant and plasticizer so as to prepare a uniform slurry and the uniform slurry is molded to form a sheet-shaped molded body so that said magnetic particles are bonded to each other.

7. A cold accumulating material for extremely low temperature cold according to claim 6, wherein a plurality of gas-passing holes are disposed in said sheet-shaped molded body comprising the magnetic particles.

8. A refrigerator including a cold accumulating unit filled with the cold accumulating material for extremely low temperature cold according to any one of claim 1 to 7.

9. A refrigerator according to claim 8, wherein said cold accumulating material for extremely low temperature cold is loaded in said cold accumulating unit such that said cold accumulating material is wound in a shape of a roll.

10. A refrigerator according to claim 8, wherein said cold accumulating material for extremely low temperature cold is formed of a plurality of plate-shaped cold accumulating elements each having a plurality of gas-passing holes and said plurality of the cold accumulating elements are stacked in multiple layers in an axial direction of said cold accumulating unit.

11. A heat shielding member for extremely low temperature wherein a cold accumulating material for extremely low temperature cold according to any one of claim 1 to 6 is integrally bonded to a reinforcement member made of a different material from said cold accumulating material for extremely low temperature cold.

12. A heat shielding member for extremely low temperature according to claim 11, wherein said reinforcement member is made of metallic material of at least one kind selected from Cu, Al, Fe, Ni and an alloy constituted mainly of said metallic material.

13. A heat shielding member for extremely low temperature according to claim 11, wherein said cold accumulating material for extremely low temperature cold is a sheet-shaped cold accumulating material formed by filling pores of a porous carrier with magnetic particles together with a binder.

14. A heat shielding member for extremely low temperature according to claim 13, wherein said cold accumulating material for extremely low temperature cold and said reinforcement member are bonded to each other with said binder.

15. A cold reservation unit comprising a refrigerator cooling a superconductive magnet, and a plurality of heat shielding members for extremely low temperature according to claim 11 disposed coaxially around said superconductive magnet, wherein each of said heat shielding members has a cyclindrical shape or curved shape.

* * * * *